US007199544B2

(12) United States Patent
Henle

(10) Patent No.: US 7,199,544 B2
(45) Date of Patent: Apr. 3, 2007

(54) DEVICE FOR STEERING A VEHICLE

(75) Inventor: Jörg Henle, Deubach (DE)

(73) Assignee: Wittenstein AG, Igersheim (DE)

( * ) Notice: Subject to any disclaimer, the term of this patent is extended or adjusted under 35 U.S.C. 154(b) by 0 days.

(21) Appl. No.: 10/547,253

(22) PCT Filed: Dec. 12, 2003

(86) PCT No.: PCT/EP03/14154

§ 371 (c)(1),
(2), (4) Date: Aug. 29, 2005

(87) PCT Pub. No.: WO2004/080795

PCT Pub. Date: Sep. 23, 2004

(65) Prior Publication Data

US 2006/0186848 A1 Aug. 24, 2006

(30) Foreign Application Priority Data

Mar. 10, 2003 (DE) ................................ 103 10 717

(51) Int. Cl.
*B60L 3/12* (2006.01)

(52) U.S. Cl. ....................... 318/552; 318/550; 318/555; 318/544; 74/469; 74/473.12; 74/112; 74/625; 74/640

(58) Field of Classification Search ................ 318/552, 318/550, 555, 544; 244/75.1, 197; 74/469, 74/473.12, 112, 625, 640
See application file for complete search history.

(56) References Cited

U.S. PATENT DOCUMENTS

| | | | | |
|---|---|---|---|---|
| 4,476,954 | A * | 10/1984 | Johnson et al. | 180/333 |
| 4,494,061 | A | 1/1985 | Kaye | 318/628 |
| 4,633,977 | A * | 1/1987 | Holmes | 187/244 |
| 4,947,070 | A * | 8/1990 | Hill et al. | 310/80 |
| 5,223,776 | A * | 6/1993 | Radke et al. | 318/568.1 |
| 6,227,320 | B1 * | 5/2001 | Eggert et al. | 180/19.2 |
| 6,511,354 | B1 * | 1/2003 | Gonring et al. | 440/87 |
| 6,752,224 | B2 * | 6/2004 | Hopper et al. | 180/22 |
| 6,904,823 | B2 * | 6/2005 | Levin et al. | 74/471 XY |
| 6,966,397 | B2 * | 11/2005 | Yanaka | 180/315 |
| 2003/0098196 | A1 * | 5/2003 | Yanaka | 180/315 |

FOREIGN PATENT DOCUMENTS

| | | |
|---|---|---|
| DE | 199 26 800 | 12/2000 |
| EP | 0 503 801 | 9/1992 |
| EP | 0 875 451 | 11/1998 |

* cited by examiner

*Primary Examiner*—Rita Leykin
(74) *Attorney, Agent, or Firm*—Bachman & LaPointe, P.C.

(57) ABSTRACT

A device for steering a vehicle, particularly a helicopter or even a simulator, comprising a handgrip that can be moved in a manner that is linear to the drive of a drive device, particularly the power unit or motor. The linear motion of the handgrip is coupled with a rotational motion of a drive element.

17 Claims, 3 Drawing Sheets

DEVICE FOR STEERING A VEHICLE

BACKGROUND OF THE INVENTION

The invention relates to an apparatus for controlling a vehicle, a helicopter or a simulator with a handle which can be moved linearly in order to drive a drive device, an engine or motor.

Many forms and embodiments of apparatuses such as these are known on the market and are in use. They are used essentially for controlling simulators and helicopters, but also for controlling any other desired vehicles or aircraft. In this case, a handle can move essentially linearly in order, for example, to operate an engine, a motor or some other drive device for a vehicle or an aircraft, or in order to transmit a corresponding position or a selected operating state in the form of signals as an actual value to a flight simulator.

The conventional known apparatuses have the disadvantage that they are large, complex and costly, in particular being provided with linkages, cable runs or the like of different complexity. Particularly for helicopter control as well as for controlling flight simulators, these apparatuses are expensive to procure and are complex to maintain.

DE 199 26 800 discloses an apparatus for controlling an engine. In this case, a throttle lever is moved linearly in a slot, with the throttle lever itself being guided on a spindle, and the linear movement of the throttle lever being converted to a rotational movement of the spindle. A similar apparatus is disclosed in U.S. Pat. No. 4,947,070 as well as U.S. Pat. No. 4,494,061 and EP 0 875 451 A2.

EP 0 503 801 A2 discloses a controller which can be operated by hand, can be moved linearly and generates corresponding signals via corresponding switches in specific positions in which it can be latched in place.

The present invention is based on the object of providing an apparatus of the type mentioned initially which overcomes the stated disadvantages and which allows the production of an apparatus in a simple and cost-effective manner for exact control of vehicles, aircraft, in particular helicopters and flight simulators, while also allowing active force feedback to the handle. In this case, one aim is for the capability for this apparatus to be accommodated well in confined installation spaces, to increase safety and reliability in operation, and to minimize the maintenance effort.

SUMMARY OF THE INVENTION

In order to achieve this object, the linear movement of the handle is coupled to a rotational movement of a drive element, in which case a control rod can be driven actively by means of the drive element and can be moved linearly in both directions along a control axis, and any tensile and/or compressive force acting on the handle can be determined via a force sensor and is used for active control of the drive element and for active movement of the control rod.

In the case of the present invention, a drive element is connected to a holding element, with the drive element being formed from a control device, an electric motor connected to it and a gearbox connected to the electric motor. A pinion gear is connected to the gearbox via a shaft, flange or the like which is not illustrated in any more detail here.

The electric motor or the drive element is preferably connected to the holding element in a fixed manner or such that it can be detached again, with the pinion gear passing through an opening in the holding element.

The holding element is connected to a mount element, which is preferably formed from a baseplate and side flanges which are in each case connected to it at the side, with the side flanges being firmly connected to the holding element.

Guide elements are inserted into corresponding recesses, possibly as sliding or bearing shells, in the side flanges.

A control rod is mounted such that it can move linearly along a control axis through this recess and/or through the guide elements. The control rod is provided with corresponding toothed rod areas, which engage with the tooth systems on the pinion gear.

This allows a rotational movement of the pinion gear to be changed to a linear movement of a control rod.

One important factor with the present invention is that a force sensor is provided at the end of the control rod, on which a handle is seated in order to move the control rod in the linear X direction.

Tensile and compressive forces, which are exerted on the control rod from the handle by means of a human hand, are determined via the force sensor.

If, for example, the control rod is intended to be moved downwards, then it is moved downwards by the application of pressure, in which case a downward movement can be assisted by the electric motor, with the changed operating position being detected in the control device in this way.

This makes it possible to deduce the current position of the apparatus, in particular of the control rod, exactly. This allows the operating state, for example half power, three-quarters power or full power, to be indicated in the simulator or else in the vehicle. This signal can also be used for controlling the simulator.

In particular, this active drive and drive capability of the control rod, and thus of the handle as well, are particularly important since, for example, the current selected position, for example in the auto pilot mode, is also always indicated to the pilot, so that the pilot is always provided with feel for the aircraft's operating state. This contributes considerably to the operational safety of a vehicle, in particular of a helicopter or aircraft, and is likewise intended to be within the scope of the present invention.

BRIEF DESCRIPTION OF THE DRAWINGS

Further advantages, features and details of the invention will become evident from the following description of preferred exemplary embodiments and from the drawing, in which.

DETAILED DESCRIPTION

Figure 1:
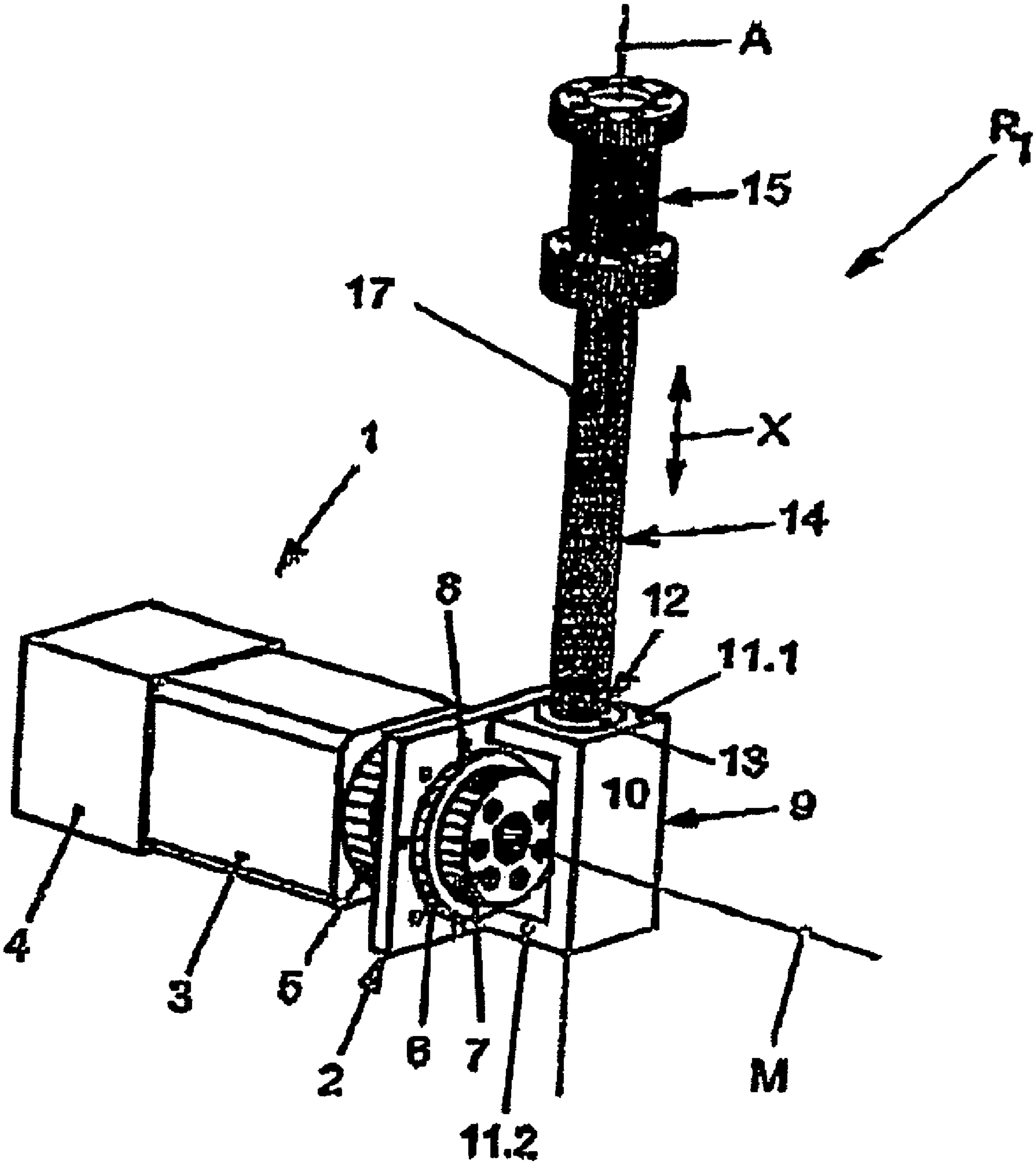
FIG. 1 shows a schematically illustrated perspective view of an apparatus according to the invention for controlling a vehicle, in particular a helicopter.

As can be seen from FIG. 1, an apparatus, $R_1$ according to the invention for controlling a vehicle, in particular a helicopter or else a simulator, has a drive element 1 which can be connected to a holding element 2 such that it can be detached again. The holding device 1 essentially comprises an electric motor 3 to which a control device 4 is connected at one end, and a gearbox 5 at the other end. At least part of the gearbox 5 preferably passes through an opening 6, on the end of which a pinion gear 7 is seated. The pinion gear 7 is preferably provided with a tooth system 8, which is only indicated here.

The holding element 2 which is not illustrated in any more detail here, is firmly connected to the vehicle, in particular to the helicopter or its fuselage compartments, or is a component of a housing structure.

The pinion gear 7 can be driven to rotate about the center axis M by means of the electric motor 3 of the drive element 1.

A mount element 9 is connected to the holding element 2 firmly or such that it can be detached again, and is formed like a U with a baseplate and with side flanges 11.1, 11.2 which are each connected to it at the end, at an angle. The two side flanges 11.1, 11.2 are separated from one another and run parallel to one another, and their end faces are connected to the holding element 2 firmly or such that they can be detached again.

Mutually aligned recesses 12 are provided in the side flanges 11.1, 11.2 into which, if required, corresponding guide elements 13 in the form of sliding bushes or sliding bearings are inserted. A control rod 14 engages in these guide elements 13, which are only indicated in the side flange 11.1 in FIG. 1, such that it can move linearly in both directions, in the illustrated x direction, along a control axis A. A force sensor 15 is connected to the end of the control rod 14 with a handle 16 being seated on its end, as is indicated in particular in FIG. 3. The control axis A and the center axis M are preferably arranged at right angles to one another, but lie on different planes.

The control axis A is offset eccentrically with respect to the center axis M of the drive element 1, so that a toothed rod area 17, which is only indicated here, of the control rod 14 engages with the pinion gear 7 that is seated on the gearbox 5, so that a rotational movement of the pinion gear 7 is coupled to a linear movement of the control rod 14 along the control axis A.

This allows the control rod 14 to be driven actively via the drive element 1, in which case a drive can be supported and/or controlled appropriately via the compression or tension signals from the force sensor 15.

Figure 2:
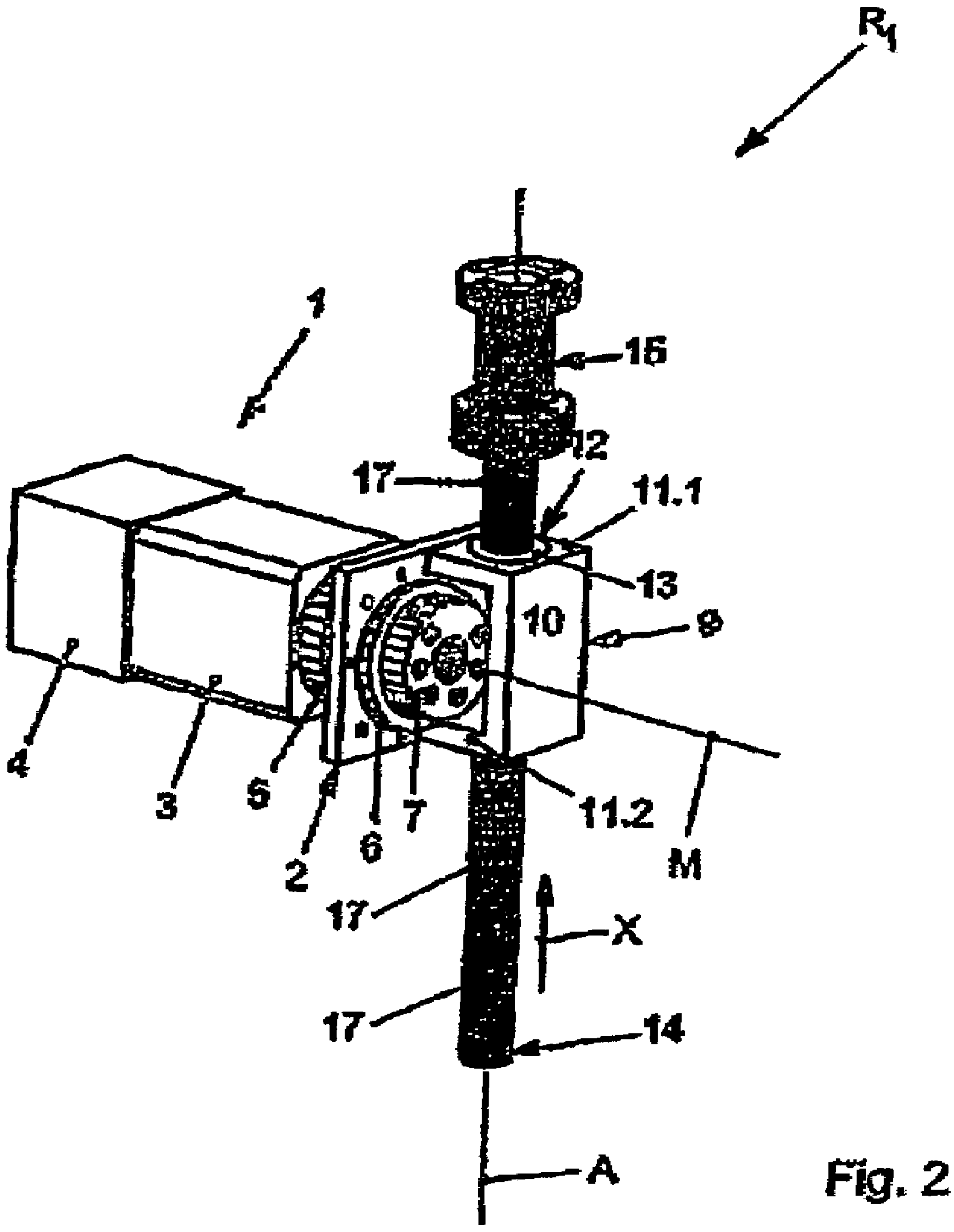
FIG. 2 shows a schematically illustrated perspective view of the apparatus shown in FIG. 1, in a different usage position.

By way of example, FIG. 2 shows the control rod 14 in a different usage position, in which it has been moved into the mount element 9.

Figure 3:
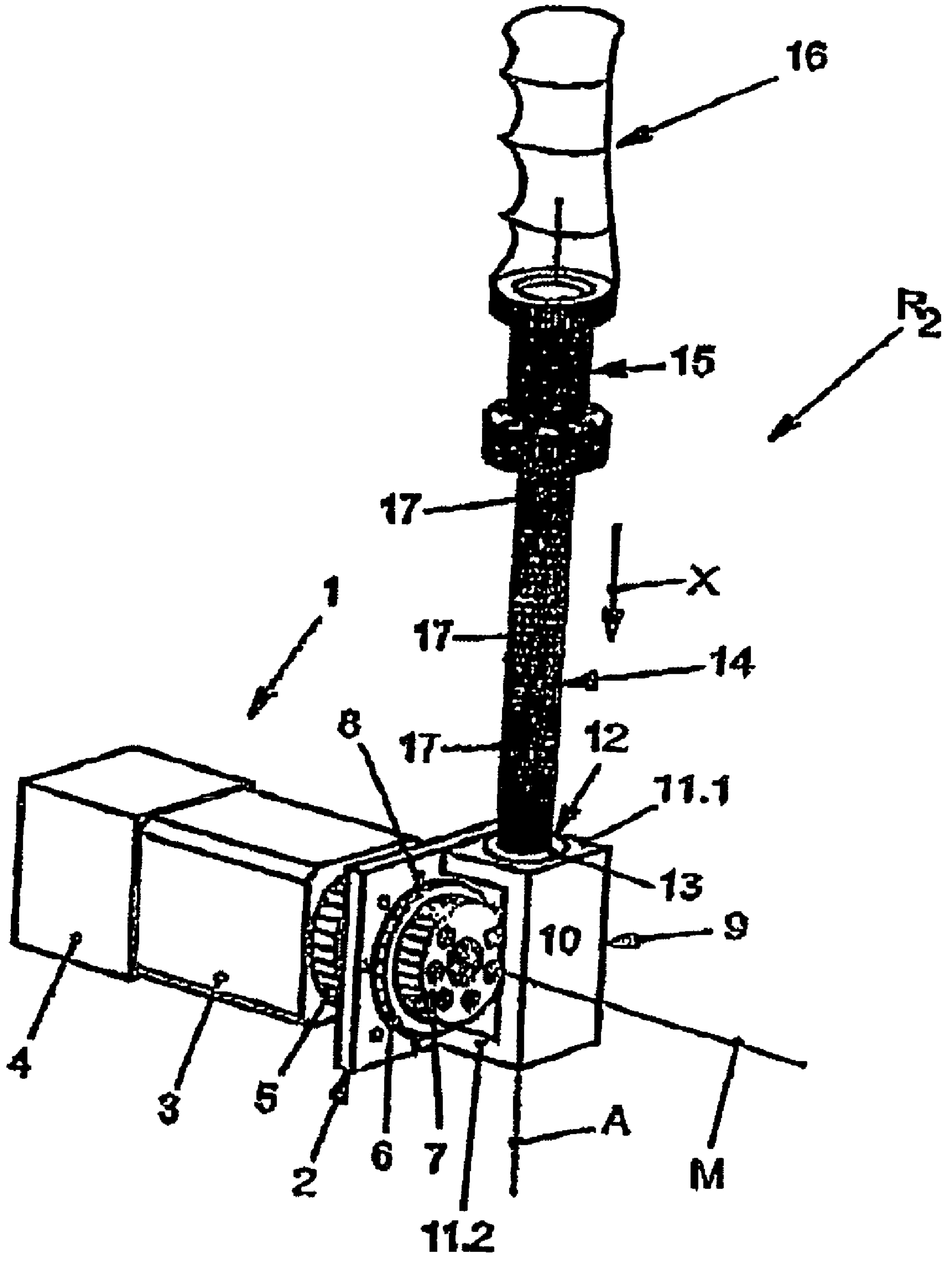
FIG. 3 shows a schematically illustrated perspective view of the apparatus as shown in FIGS. 1 and 2, with a handle fitted to a force sensor.

The control rod 14 and/or the handle 16 and force sensor 15 can be moved upwards again, as is indicated in FIG. 3, by appropriately pulling on a handle, which is not illustrated in any more detail here. If, by way of example, the force sensor 15 is subjected to a tensile load by means of the handle 16 while it is being pulled upwards, then a corresponding linear movement of the control rod 14 is activated and supported by the pinion gear 7 being driven to rotate, on a control device, which is not illustrated here, or control system for the electric motor 3.

Another intention of the present invention is not only that the pinion gear 7 can engage in an interlocking manner with the tooth system 8 in a toothed rod area 17 on the control rod 14, but that other options are also possible for changing or coupling the rotary movement of the pinion gear 7 or of a disk to a linear movement of the control rod 14. For example, a rotational movement of a disk or of the pinion gear 7 can likewise be changed to a linear movement of the control rod 14 by means of a friction fit, via cable runs or the like. The invention is not intended to be restricted to this.

The invention claimed is:

1. An apparatus for controlling a vehicle, helicopter or simulator, comprising a handle movable linearly for actuating a drive device, a motor, wherein linear movement of the handle is coupled to a rotational movement of a drive element, wherein by means of the drive element a control rod is actively drivable and by means of a face sensor a tensile and/or compressive force acting on the handle is determinable for active control of the drive element and for active movement of the control rod, the control rod is movable to and fro along a control axis (A).

2. An apparatus to claim 1, wherein the drive element is formed by a control unit adjoined by an electric motor with an adjoining gear unit.

3. An apparatus according to claim 2, wherein adjoining the gear unit is a pinion.

4. An apparatus according to claim 3, wherein the drive element is fastenable to a holding element.

5. An apparatus according to claim 4, wherein at least part of the gear unit and the entire pinion extends through an opening of the holding element.

6. An apparatus according to claim 4, wherein associated with the holding element is a carrier element.

7. An apparatus according to claim 6, wherein the carrier element is of a U-like design and is formed by a base plate adjoined in each case laterally and at an angle by side flanges.

8. An apparatus according to claim 7, wherein the side flanges are connected at a face end to the holding element.

9. An apparatus according to claim 6, wherein the carrier element is associated with the holding element eccentrically relative to a center line (M) of the gear unit and/or of the pinion.

10. An apparatus according to claim 7, wherein the side flanges of the carrier element have recesses with inserted guide elements through which a control rod engages in a linearly movable and precisely fitting manner.

11. An apparatus according to claim 3, wherein the control rod communicates with the pinion.

12. An apparatus according to claim 11, wherein a tooth system of the pinion engages a gear rack region of the control rod.

13. An apparatus according to claim 1, wherein the handle adjoins the end of the control rod.

14. An apparatus according to claim 1, wherein the force sensor is inserted at an end of the control rod between the control rod and the handle.

15. An apparatus according to claim 14, wherein, in simulator mode too, the control rod is drivable linearly by means of the drive element.

16. An apparatus according to claim 2, wherein the control unit of the drive element determines an actual position of the control rod during operation.

17. An apparatus according to claim 1, wherein the control rod is movable along control axis (A) that extends approximately perpendicular to a center line (M) of the drive element, wherein the control axis (A) is disposed eccentrically relative to the center line (M) of the drive element.

* * * * *